(12) United States Patent
Lim

(10) Patent No.: US 8,738,086 B2
(45) Date of Patent: May 27, 2014

(54) TERMINAL AND METHOD FOR CONTROLLING OPERATION OF THE TERMINAL

(75) Inventor: Yoen Lae Lim, Eunpyeong-gu (KR)

(73) Assignee: LG Electronics Inc., Seoul (KR)

(*) Notice: Subject to any disclaimer, the term of this patent is extended or adjusted under 35 U.S.C. 154(b) by 1207 days.

(21) Appl. No.: 11/933,917

(22) Filed: Nov. 1, 2007

(65) Prior Publication Data

US 2008/0119233 A1 May 22, 2008

(30) Foreign Application Priority Data

Nov. 1, 2006 (KR) .................. 10-2006-0107202

(51) Int. Cl.
*H04B 1/38* (2006.01)
(52) U.S. Cl.
USPC .... 455/564; 455/566; 455/550.1; 379/355.02
(58) Field of Classification Search
None
See application file for complete search history.

(56) References Cited

U.S. PATENT DOCUMENTS

| 7,007,239 B1 | 2/2006 | Hawkins et al. |
| 2004/0237114 A1* | 11/2004 | Drazin ........................ 725/105 |
| 2005/0079895 A1* | 4/2005 | Kalenius et al. ............. 455/566 |
| 2005/0130614 A1 | 6/2005 | Suzuki |
| 2005/0130642 A1* | 6/2005 | Scott ............................ 455/418 |
| 2006/0205432 A1* | 9/2006 | Hawkins et al. ........... 455/552.1 |
| 2007/0116247 A1* | 5/2007 | Chung et al. ............. 379/355.02 |

FOREIGN PATENT DOCUMENTS

| EP | 1 164 770 A2 | 12/2001 |
| JP | 2002-354365 A | 12/2002 |
| KR | 10-2003-0020101 A | 3/2003 |
| KR | 10-2006-0056684 A | 5/2006 |
| KR | 10-2006-0060181 A | 6/2006 |
| KR | 10-2006-0099039 A | 9/2006 |

* cited by examiner

*Primary Examiner* — Wayne Cai
(74) *Attorney, Agent, or Firm* — Birch, Stewart, Kolasch & Birch, LLP

(57) ABSTRACT

A method for controlling an operation of a mobile terminal. The method includes: entering a speed dial setting mode for setting a speed dial operation on the mobile terminal, displaying speed dial keys on the mobile terminal, when the speed dial setting mode is entered, selecting a specific speed dial key from the displayed speed dial keys, displaying a plurality of object groups corresponding to functions that may be performed by the mobile terminal, in response to the specific speed dial key being selected, selecting one of the plurality of object groups, selecting an object in the selected object group; and assigning the selected object to the selected specific speed dial key such that the selected object is performed when the specific speed dial key is manipulated.

17 Claims, 5 Drawing Sheets

TERMINAL AND METHOD FOR CONTROLLING OPERATION OF THE TERMINAL

CROSS-REFERENCE TO A RELATED APPLICATION

The present application claims priority from Korean Patent Application No. 10-2006-0107202, filed in Korea on Nov. 1, 2006, the entire contents of which is incorporated herein by reference.

BACKGROUND OF THE INVENTION

1. Field of the Invention

The present invention relates to a mobile communication terminal and corresponding mobile terminal communication method in which a plurality of different functions that may be performed on the mobile terminal are set to specific speed dial keys.

2. Description of the Related Art

Mobile terminals provide many functions in addition to the basic call service. For example, mobile terminal users can now watch movies, play games, access the Internet, listen to music, etc. Therefore, because a plurality of different functions are provide on the mobile terminal, the mobile terminal also includes a plurality of corresponding menu options allowing a user to set or change specific characteristics of each function.

For example, to send a text message to another user, the user first accesses a main menu, and then selects a plurality of sub-menu options to create and send the text message. Similarly, when the user wants to access the Internet, the user first selects a main menu option, and then selects several sub-menu options to access the Internet. Therefore, the user must navigate through several menu options to perform a specific function. This process is time consuming and cumbersome.

SUMMARY OF THE INVENTION

Accordingly, one object of the present invention is to address the above-noted and other objects.

Another object of the present invention is to provide a mobile terminal and corresponding method in which speed dial keys may be easily set for a plurality of different functions that may be performed on the mobile terminal.

To achieve these and other advantages and in accordance with the purpose of the present invention, as embodied and broadly described herein, the present invention provides in one aspect a method for controlling an operation of a mobile terminal The method includes entering a speed dial setting mode for setting a speed dial operation on the mobile terminal, displaying speed dial keys on the mobile terminal, when the speed dial setting mode is entered, selecting a specific speed dial key from the displayed speed dial keys, displaying a plurality of object groups corresponding to functions that may be performed by the mobile terminal, in response to the specific speed dial key being selected, selecting one of the plurality of object groups, selecting an object in the selected object group, and assigning the selected object to the selected specific speed dial key such that the selected object is performed when the specific speed dial key is manipulated.

In another aspect, the present invention provides a mobile terminal, which includes a display unit configured to display information, an input device configured to enter a speed dial setting mode for setting a speed dial operation on the mobile terminal, and a control unit configured to display on the display unit speed dial keys when the speed dial setting mode is entered, to receive an input corresponding to a specific speed dial key being selected from the displayed speed dial keys, to display a plurality of object groups corresponding to functions that may be performed by the mobile terminal, in response to the specific speed dial key being selected, to receive an input corresponding to one of the plurality of object groups being selected, to receive an input corresponding to an object in the selected object group being selected, and to assign the selected object to the specific speed dial key such that the selected object is performed when the specific speed dial key is manipulated.

In still another aspect, the present invention provides a method for controlling an operation of a mobile terminal. The method includes executing a function on the mobile terminal, entering a speed dial setting mode for setting a speed dial operation on the mobile terminal, displaying speed dial keys on the mobile terminal, when the speed dial setting mode is entered, selecting a specific speed dial key from the displayed speed dial keys, and assigning the executing object to the selected specific speed dial key such that the function is again executed when the specific speed dial key is manipulated. The present invention also provides a corresponding mobile communication terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above aspects of the present invention will be more apparent by describing certain exemplary embodiments of the present invention with reference to the accompanying drawings, in which.

DETAILED DESCRIPTION OF THE PREFERRED EMBODIMENTS

Hereafter, embodiments of the present invention will be explained in detail with reference to the accompanying drawings.

Figure 1:
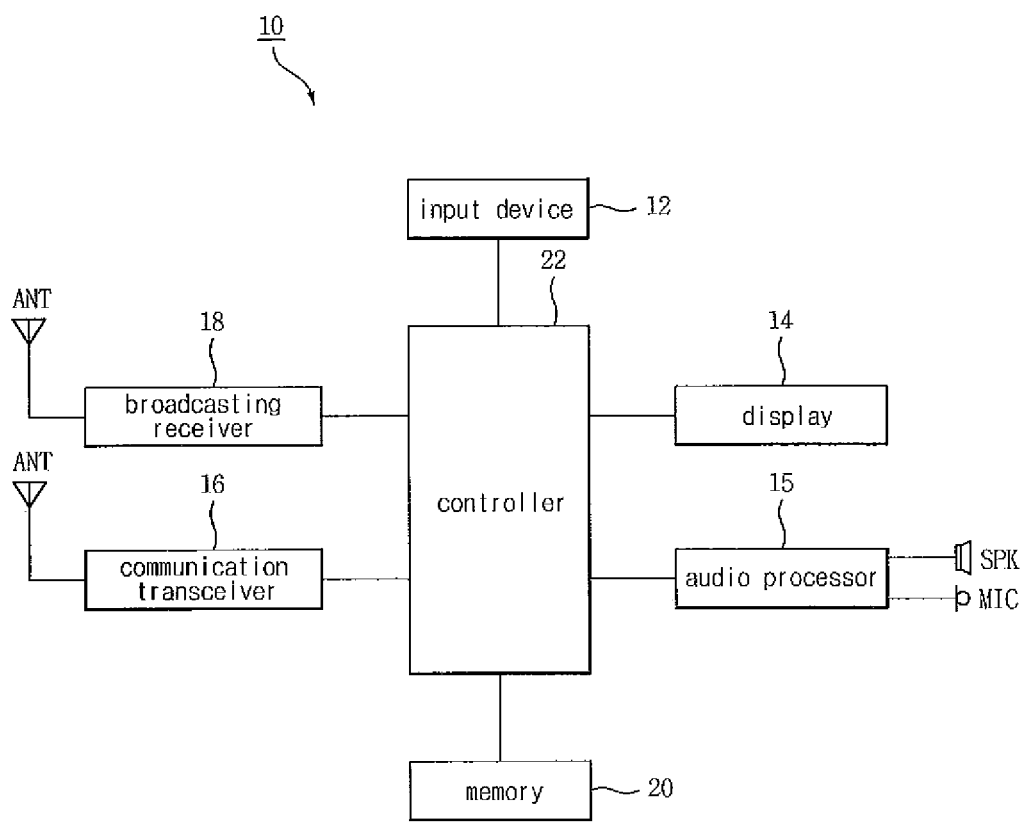
FIG. 1 is a block diagram of a mobile terminal according to an embodiment of the present invention.

Turning first to FIG. 1, which is a block diagram of a mobile terminal 10 according to an embodiment of the present invention. As shown, the mobile terminal 10 includes an input device 12, a display 14, an audio processor 15, a communication transceiver 16, a broadcasting receiver 18, a memory 20, and a controller 22.

The input device 12 functions as an interface to communicate with peripherals or users. For example, the input device 12 includes a key pad on which multiple key buttons are arranged, a navigation key having various directional keys, a jog dial for selecting types of inputs based on the amount of its rotation, a voice input device embedded with a voice recognition component, and a touch input device such as a touch pad or touch screen. Thus, various information or commands related to setting or executing a speed dial operation can be entered using the input device 12.

Further, the display 14 displays various types of information to a user, such as an operational status of the terminal, different display screens used in setting speed dial keys, etc. Thus, a user of the terminal can view the different display screens used in setting the speed dial keys and enter any required information using the input device 12 and display 14.

In addition, the audio processor 15 is used to process a user's voice, play music, play different ring tones when a call is received, etc. using a microphone MIC and a speaker SPK. Thus, according to the present invention, the user can input commands verbally into the terminal. The appropriate voice recognition software programs are also included in the terminal 10.

The communication transceiver 16 wirelessly communicates with other entities over different types of wired/wireless communication networks. Therefore, the terminal 10 including the communication transceiver 16 can perform a variety of different types of communication such as voice telecommunication, sending messages, accessing the Internet, sending/receiving data, performing telephone functions, providing an instant messenger service, etc.

In addition, the broadcasting receiver 18 receives broadcasting signals aired by a broadcasting center in accordance with various digital broadcasting standards. The broadcasting receiver 18 also sends the received broadcasting signals to the controller 22 or other devices such that a user may view a particular broadcast program. Thus, the mobile terminal 10 functions as a broadcasting terminal, a digital broadcasting terminal embedded with a navigator (not shown), a broadcasting reproducible display device including a monitor, etc.

Currently, the digital broadcasting standards include, for example, the Eureka-147 based European DAB (Digital Audio Broadcasting) standard, the DVB-H (Digital Video Broadcasting-Handheld) standard, and the Media FLO (Forward Link Only) standard led by Qualcomm, U.S. companies, and the Korean DMB group. In addition, the Korean DMB system includes the Eureka-147-based T-DMB (Terrestrial Digital Multimedia Broadcasting) and S-DMB (Satellite Digital Multimedia Broadcasting) standards. Thus, a user of the terminal 10 can view a variety of different broadcasting programs.

Further, although the present invention is being described with respect to digital broadcasting standards for mobile type digital broadcasting, other types of digital broadcasting standards can also be used. That is, the digital broadcasting standards according to the present invention include fixed digital broadcasting standards such as the American digital TV standards (ATSC), i.e., 8-VSB, developed by Zenith, a U.S. company, and the European DVB-T (Digital Video Broadcasting-Terrestrial) standard. Thus, the present invention is applicable to the fixed digital broadcasting system as well as the mobile digital broadcasting system.

In addition, the memory 20 stores a program for processing and controlling the terminal 10, reference data, various updateable data and so on. The memory 20 also stores all programs and data used to set up and execute the speed dial function of the present invention. For example, the memory 20 stores specific object groups and corresponding objects in the speed dial setting mode. Further, the specific object groups or objects can be stored in advance in the memory 20 without entering into the speed dial setting mode. For example, channel numbers for public broadcasting can be stored in advance in the memory 20 so that the broadcasting channels can be received.

In addition, object groups in this description correspond to functions that may be performed on the terminal such as receiving broadcasts (i.e., a broadcasting object group), performing call services (i.e., a telephone number group), etc. The objects in the object groups correspond to individual items in the object group. For example, in the broadcasting object group, the objects correspond to different broadcasting programs or channels.

Further, the controller 22 controls the overall operation of the mobile terminal 10 using the different elements of the terminal 10. In addition, the controller 22 also performs and controls the speed dial key setting operations of the present invention. That is, the controller 22 receives information input through the input device 12 such that the user can enter a speed dial setting mode for setting a speed dial operation on the mobile terminal.

The controller 22 also controls the display 14 to display speed dial keys on the mobile terminal, when the speed dial setting mode is entered, to receive from the user a specific speed dial key from the displayed speed dial keys, and to display on the display 14 a plurality of object groups corresponding to functions that may be performed by the mobile terminal, in response to the specific speed dial key being selected. The user then selects one of the plurality of object groups and an object in the selected object group using the input device 12. The controller 22 then assigns the selected object to specific speed dial key such that the selected object is performed when the specific speed dial key is manipulated.

In addition, the plurality of object groups corresponding to functions that may be performed by the mobile terminal include a telephone number group allowing a call to be established at a specific telephone number when the speed dial key is manipulated, a broadcasting channel group allowing broadcasting signals received through a specific broadcasting channel to be reproduced when the speed dial key is manipulated, an Internet website group allowing a specific website to be entered when the speed dial key is manipulated, an instant messaging group allowing an instant message to be established with another user when the speed dial key is manipulated, a file transfer group allowing a selected file to be transferred to another user when the speed dial key is manipulated, and a multimedia file group allowing a specific multimedia file to be played when the speed dial key is manipulated.

Thus, according to an embodiment of the present invention, the user can assign a speed dial key to access a specific website such as the website "www.lge.com." The user may also change already assigned speed dial keys as desired. For example, when an MBC broadcasting channel (i.e., a Korean broadcasting station) is assigned to the speed dial key "11", the user can change the speed dial key "11" to be a customer's telephone number "82-32-320-1234." That is, the controller 22 first assigns the speed dial key "11" to the MBC broadcasting channel object of the broadcasting channel group, and then changes the speed dial key "11" into the customer's telephone number object of the telephone number group.

As described above, the types and numbers of object groups applicable to the present invention are diverse. In addition, to simplify the description of the present invention, the telephone number group and the broadcasting channel group will be referred to. A similar method applies to the other object groups mentioned above.

Figure 2:
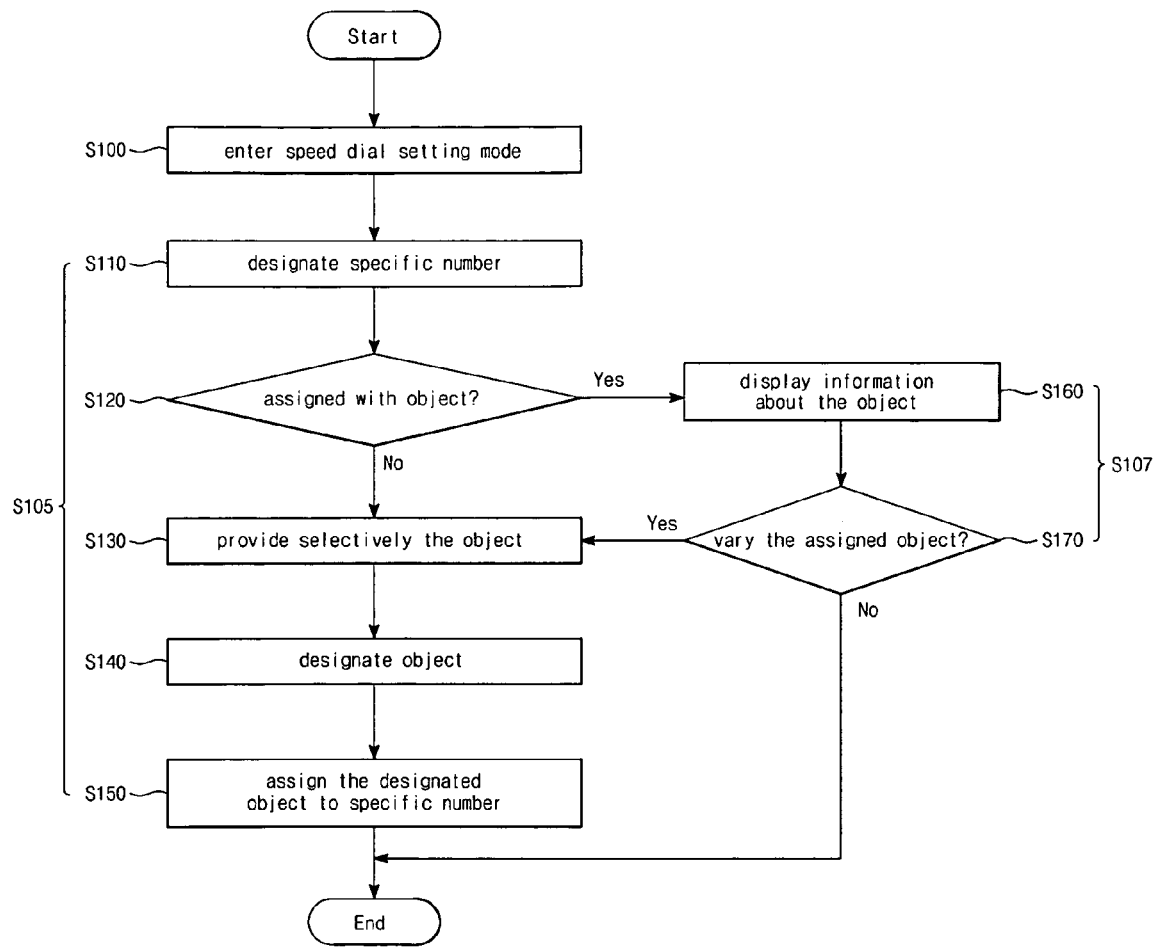
FIG. 2 is a flowchart illustrating a method of controlling an operation of a mobile terminal according to an embodiment of the present invention.

Turning next to FIG. 2, which is a flowchart illustrating a method for controlling an operation of a terminal according to an embodiment of the present invention. FIG. 1 will also be referred to in this description. As shown, the user first enters the speed dial setting mode (S100), and selects an object from an object group (S105). The user can also change an already assigned speed dial key in step S107.

In more detail, the user enters the speed dial setting mode using the input device 12 or by selecting a specific hot key on the terminal. In another example, the speed dial setting mode can be automatically started when a specific function is started on the terminal. For example, the speed dial setting mode can be automatically started when the user first activates the broadcasting feature on the terminal. The user can then select a particular speed dial key from a plurality of different speed dial keys to correspond to the particular broadcasting channel.

Figure 3:
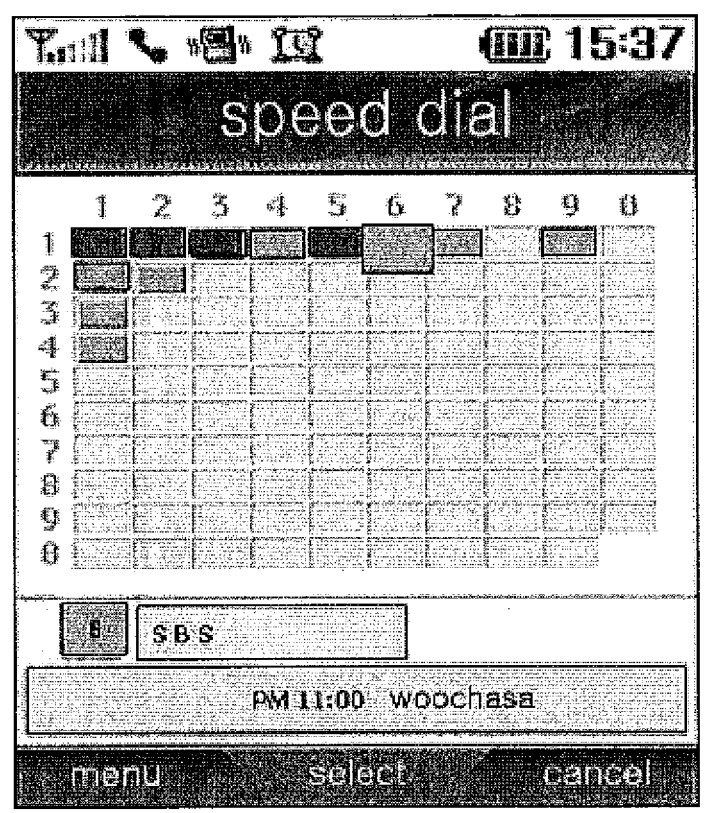
FIG. 3 is a display screen illustrating assigned and non-assigned speed dial keys on a mobile terminal in a matrix form according to an embodiment of the present invention.

In addition, FIG. 3 illustrates a plurality of speed dial keys that are displayed when the user first enters the speed dial setting mode. As shown in FIG. 3, the controller 22 controls the display 14 to display the speed dial keys in a matrix form. Further, the matrix form includes assigned and non-assigned speed dial keys. As shown, the assigned speed dial keys are highlighted to distinguish them from the non-assigned speed dial keys. For example, a different color may be assigned to speed dial keys that are already assigned.

In addition, in FIG. 3, the speed dial keys 11, 12, 13, 14 in the first column are assigned to different functions or objects. Speed dial key 21 corresponding to column 2 and row 1 is also assigned to a particular function or object. Further, the speed dial key 6 is shown as being enlarged, because it is currently selected by the user. In more detail, when the user selects the speed dial key "6," the information for that speed dial key is displayed on the bottom portion of the matrix. The user can then determine what function has been assigned to each speed dial key.

Thus, with respect to FIGS. 2 and 3, the user first enters the speed dial setting mode (S100) and selects a specific speed dial key from the displayed speed dial keys shown in FIG. 3 (S110). Then, the method determines whether or not the user-selected speed dial key has already been assigned to a particular object (function) (S120).

If the speed dial key has not been assigned to a particular object (No in S120), the method provides the user with a list of objects within the particular object group (S130). For example, if the object group corresponds to the broadcasting function, the method displays a plurality of broadcasting channels (objects). The user then selects one object from the list of objects to be assigned to that particular speed dial key (S140). The controller 22 then assigns the specific object to the specific speed dial key (S150).

Thus, with reference to FIGS. 2 and 3, the user can enter the speed dial setting mode (S100) and select the speed dial key "8," which has not been assigned to any particular object (S110). The method determines the speed dial key has not been previously assigned (S120) and provides the user with a list of object groups and corresponding objects (S130). For example, the controller 22 controls the display 14 to display a list of object groups such as "1: telephone numbers, 2: broadcasting channels." The user then selects "2: broadcasting channels" and the controller 22 displays a list of broadcasting channels within the group.

The user then selects a particular broadcasting channel (S140), and the controller 22 assigns the selected speed dial key to the select broadcasting channel (S150). The user may move between the object groups "1: telephone numbers" or "2: broadcasting channels" using upper and lower keys of a navigation key in the input device 12 for example. In addition, the object group can be selected using an enter key of a key pad.

In addition, the step S120 of determining whether the object is already assigned to the designated specific speed dial key can be skipped. That is, the selected speed dial key can be automatically assigned to the selected object regardless of whether or not the speed dial key is already assigned to another object. Thus, in this example, the previously assigned object is overwritten with the new object.

Further, the user can be provided with object groups and objects within the object groups using voice instructions. For example, the controller 22 can output voice instructions through the speaker such as "Press number 1 to select a telephone number" and "Press number 2 to select a broadcasting channel". The user can then speak into the microphone "number 1" or "number 2" to select a particular object group. In these examples, the mobile terminal includes a voice recognition module.

Moreover, the step S140 of assigning the object group can be skipped, and an object containing the attribute of the object group can be assigned. For example, a channel number "35" can be assigned to the specific speed dial key. In another example, an object included in a telephone number group can be directly assigned to a specific number, e.g. the telephone number "02-203-1234" is assigned to a specific speed dial key.

Therefore, in the above description, the user assigns a specific object to a specific speed dial key. The information corresponding to the specific object and speed dial key is also stored in the memory 20. Thus, when the user selects the specific speed dial key, the assigned object is automatically activated. In the above example, when the speed dial key "8" is selected, the MBC broadcasting channel is activated and displayed on the display 14.

Turning now to step S107 in FIG. 2 in which the user re-assigns a speed dial key. FIGS. 1 and 3 will also be referred to in this description. In more detail, the method determines in step S120 that the selected speed dial key is already assigned to an object (Yes in S120). For example, the user can select the speed dial key "6" in FIG. 3, which is already assigned to the SBS broadcasting channel 6. Then in step S160, the controller 22 displays information informing the user about the already assigned object (e.g., information such as "the speed dial key 6 is already to the broadcasting channel 6, do you want to reassign the speed dial key?). Information about the current broadcasting program may also be displayed to the user.

Further, the information of the broadcasting program can be acquired based on the EPG provided from a broadcasting center through the broadcasting receiver 18 periodically or non-periodically or downloaded by the transceiver 16 over the wireless Internet. In addition, when the object group is the telephone number group, the information of the object group may include all or part of stored telephone directory information.

When the user intends to change the pre-assigned object (Yes in S170), the steps S130-S150 are performed. The step S107 can also be performed independently from the other steps.

In addition, as discussed above, the speed dial keys in FIG. 3 are differentiated from each other based on whether or not they are already assigned to an object. For example, the speed dial keys pre-assigned with objects may be colored using specific colors and the speed dial keys not assigned to objects may be colored using the same color as their background. In addition, the speed dial keys assigned to a specific object group (e.g., broadcasting object group) may be differentiated from speed dial keys assigned to another object group (e.g., telephone object group).

That is, the speed dial keys assigned to particular object groups may be colored differently according to types of the object groups. For example, when the object groups are a telephone number group and a broadcasting channel group, the speed dial keys assigned to the telephone number group may be colored in blue and the speed dial keys assigned to the broadcasting channel group may be colored in yellow.

Further, as discussed above, when the user selects a specific speed dial key in FIG. 3 using the input device 12, information about a specific object group corresponding to the selected speed dial key is displayed. For example, information about a corresponding broadcasting channel group is displayed at a lower side of the screen. That is, when the speed dial "6" is pre-assigned with the broadcasting channel "SBS" (a Korean public broadcasting channel) corresponding to a public broadcasting channel number 6, information about the public broadcasting channel "SBS" is displayed. The information may be about current or future programs delivered by SBS.

Figure 4:
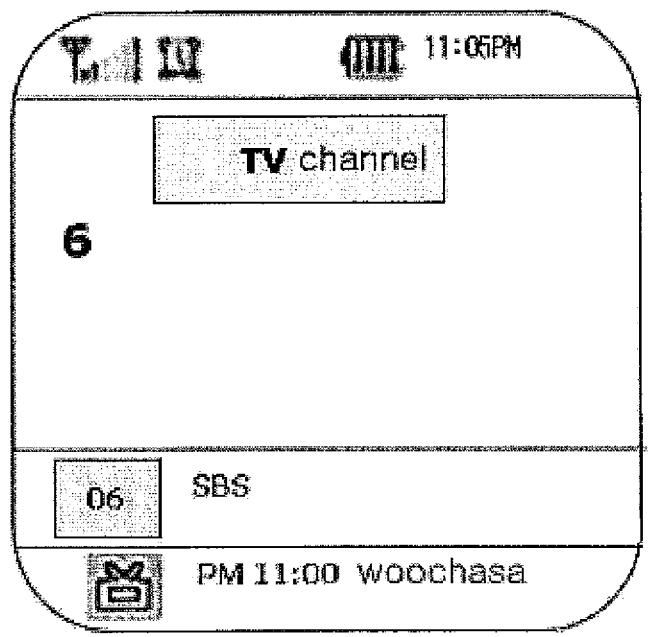
FIG. 4 is an overview illustrating a display screen used in setting a speed dial key according to an embodiment of the present invention.

In addition, when a speed dial key is selected from the screen show in FIG. 3, other types of information may be displayed to the user as shown in FIG. 4. In more detail, as shown in FIG. 4, the information includes the name of the broadcasting group ("SBS"), the channel number 6, and the title of the current program ("woochasa"). Other information may also be displayed such as what program is scheduled next, etc. The information shown in FIG. 4 may also be provided by voice using the speaker of the terminal.

Further, once the speed dial key is assigned, the speed dial key may later be selected to automatically perform the desired function. That is, the speed dial key can be selected by pressing the speed dial key for a constant period of time or pressing the speed dial key followed by a specific key. For example, in an initial state or idle state when the cover of the terminal 10 is open from its main body, the speed dial key can be selected by pressing the speed dial key continuously over a constant period of time.

Therefore, when the object groups include the telephone number and broadcasting channel groups, and a specific speed dial key is selected, a call can be established at a telephone number corresponding to the speed dial key or a broadcasting program can be received through a broadcasting channel corresponding to specific speed dial key.

Figure 5:
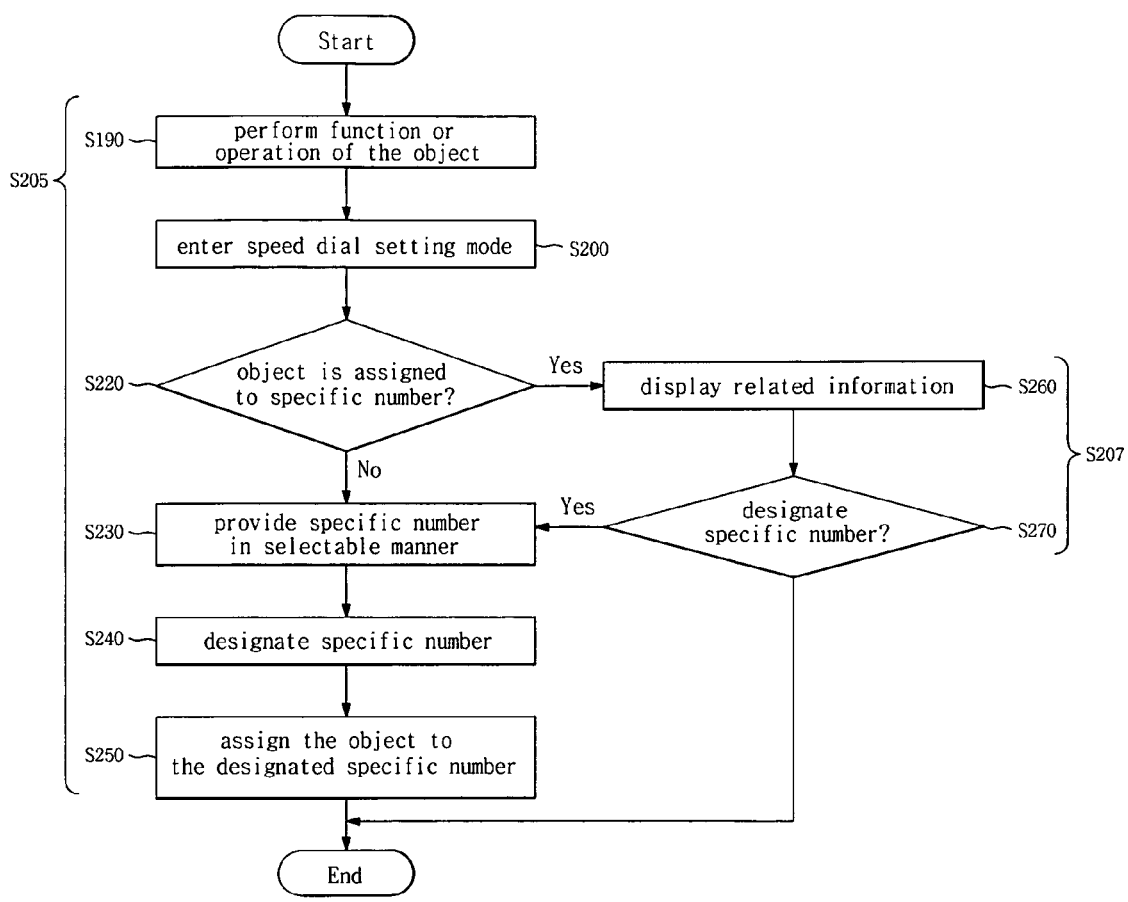
FIG. 5 is a display screen illustrating information being displayed about a set speed dial.

Next, FIG. 5 is a flowchart illustrating a method for controlling an operation of a terminal according to another embodiment of the present invention. Note that FIG. 5 differs from FIG. 2 in that the method of FIG. 5 first executes a function/object on the terminal and then assigns a specific speed dial key to the executed function/object, whereas the method of FIG. 2 first selects a specific speed dial key and then assigns a function/object to the specific speed dial key.

In more detail, the method in FIG. 5 includes the steps of executing a function/object on the terminal and entering a speed dial setting mode (S205) and varying a previously assigned speed dial key (S207). The step S205 includes first executing a function/object on the terminal (S190) and then entering the speed dial setting mode (S200). As discussed above, the speed dial setting mode can be entered by the user manipulating a specific key button on the terminal, by voice activation, etc. Thus, in this instance, the user first executes, for example, a broadcasting program "MBC" (a Korean public broadcasting channel) and then enters the speed dial setting mode by manipulating a hot key, for example.

The method then determines whether the executing function is already assigned to a speed dial key (S220). If the executing function is not assigned to a speed dial key (No in S220), the method displays speed dial keys that may be selected by the user (e.g., the speed dial key screen shown in FIG. 3) (S230). The user then selects a speed dial key (S240), and the controller 22 assigns the selected speed dial key to the executing function such that when the user manipulates the selected speed dial key at a later time, the function corresponding to the speed dial key is automatically executed.

As discussed above, the plurality of specific numbers pre- or non-assigned with the objects are displayed on the screen of the display 14 in a lattice form. Further, the pre-assigned numbers and non-assigned numbers are displayed to be differentiated from each other.

In addition, when the function or object is already assigned a specific speed dial key (Yes in S220), the method displays information about the function and corresponding speed dial key (S260). For example, the display screen shown in FIG. 5 can be displayed on the display 14.

Next, the method determines if the user wants to change the speed dial key assigned to the executing function or object (S270). If the user wants to change the speed dial key (Yes in S270), steps S230, S240 and S250 are performed. Otherwise, the method ends.

Thus, in this embodiment, the step S200 of entering the setting mode is performed while a specific object of a specific object group is executing. In addition, in step S190, the function may be selected and not actually executed until the speed dial key is finally set. Further, in this embodiment, an object group is designated and then an object included in the designated object group is selected and assigned a speed dial key. However, the step of designating the object group can be skipped and thus the object can be assigned right away.

In addition, parts of one embodiment may be combined with other embodiments of the present invention. For example, although the above description describes the information about broadcasting programs being acquired based on the EPG in the first embodiment, the information about the broadcasting programs can be acquired based the EPG likewise in the other embodiments.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling an operation of a mobile terminal, the method comprising:
    entering a hot key setting mode for setting a hot key operation on the mobile terminal;
    displaying a list of assigned and non-assigned hot keys on the mobile terminal, when the hot key setting mode is entered, wherein an assigned hot key is highlighted;
    displaying information about a plurality of object groups and objects associated with the assigned hot key;
    receiving a selection signal indicating a selection of a specific hot key from the displayed hot keys;
    displaying the plurality of object groups corresponding to functions that may be performed by the mobile terminal, in response to the selection of the specific hot key;
    receiving selection signals indicating a plurality of selections in the plurality of object groups; and assigning the selected objects in the plurality of object groups to the selected specific hot key.

2. The method of claim 1, wherein said assigned hot keys are highlighted to distinguish them from the non-assigned hot keys.

3. The method of claim 1, further comprising:
selecting a change button to change the assigned hot key to the selected object.

4. The method of claim 1, wherein the plurality of object groups corresponding to functions that may be performed by the mobile terminal include a telephone number group allowing a call to be established at a specific telephone number when the speed hot key is manipulated, a broadcasting channel group allowing broadcasting signals received through a specific broadcasting channel to be reproduced when the hot key is manipulated, an Internet website group allowing a specific website to be entered when the hot key is manipulated, an instant messaging group allowing an instant message to be established with another user when the hot key is manipulated, a file transfer group allowing a selected file to be transferred to another user when the hot key is manipulated, and a multimedia file group allowing a specific multimedia file to be played when the hot key is manipulated.

5. The method of claim 1, wherein entering the hot key setting mode is performed when a hot key setting mode key is selected for a predetermined amount of time or when a first speed dial key is selected followed by the hot key setting mode key.

6. The method of claim 1, wherein when the object group is a broadcasting object group, the displaying information step displays information about current or future programs of the broadcasting object.

7. The method of claim 6, wherein the information about the object is extracted from an EPG (Electronic program guide).

8. A mobile terminal, comprising:
a display unit configured to display information;
an input device configured to enter a hot key setting mode for setting a hot key operation on the mobile terminal; and
a control unit configured to:
display on the display unit a list of assigned and non-assigned hot keys when the hot key setting mode is entered, wherein the assigned hot key is highlighted,
display information about a plurality of object groups and objects associated with the assigned hot key,
receive an input corresponding to a specific hot key being selected from the displayed hot keys,
display a plurality of object groups corresponding to functions that may be performed by the mobile terminal, in response to the specific hot key being selected,
receive selection signals indicating a plurality of selections in the plurality of object groups, and
assign the selected objects in the plurality of object groups to the selected specific hot key.

9. The mobile terminal of claim 8, wherein said assigned hot keys are highlighted to distinguish them from the non-assigned hot keys.

10. The mobile terminal of claim 9, wherein the control unit highlights an assigned hot key, and controls the display unit to display information about the object groups and objects associated with the assigned hot key.

11. The mobile terminal of claim 10, wherein the control unit provides a change button on the display unit to change the assigned hot key to the selected object.

12. The mobile terminal of claim 10, wherein when the object group is a broadcasting object group, the control unit controls the display unit to display information about current or future programs of the broadcasting object.

13. The mobile terminal of claim 12, wherein the information about the object is extracted from an EPG (Electronic program guide).

14. The mobile terminal of claim 8, wherein the plurality of object groups corresponding to functions that may be performed by the mobile terminal include a telephone number group allowing a call to be established at a specific telephone number when the hot key is manipulated, a broadcasting channel group allowing broadcasting signals received through a specific broadcasting channel to be reproduced when the hot key is manipulated, an Internet website group allowing a specific website to be entered when the hot key is manipulated, an instant messaging group allowing an instant message to be established to another user when the hot key is manipulated, a file transfer group allowing a selected file to be transferred to another user when the hot key is manipulated, and a multimedia file group allowing a specific multimedia file to be played when the hot key is manipulated.

15. The mobile terminal of claim 8, wherein the control unit enters the hot key setting mode when a hot key setting mode key on the input unit is selected for a predetermined amount of time or when a first hot key is selected followed by the hot key setting mode key.

16. A method for controlling an operation of a mobile terminal, the method comprising:
entering a hot key setting mode for setting a hot key operation on the mobile terminal;
displaying information about a plurality of object groups and objects associated with at least one of assigned hot key;
receiving a selection of a specific hot key;
displaying a plurality of object groups corresponding to functions that may be performed by the mobile terminal, in response to the selection of the specific hot key;
receiving a selection of the plurality of object groups;
receiving a selection of a plurality of objects in the plurality of selected object groups;
assigning the selected objects in the plurality of object groups to the selected specific hot key; and
executing one of the selected objects when the specific hot key is selected.

17. A method for controlling an operation of a mobile terminal, the method comprising:
executing a function on the mobile terminal;
entering a hot key setting mode for setting a hot key operation on the mobile terminal;
displaying a list of assigned and non-assigned hot keys on the mobile terminal, when the hot key setting mode is entered, wherein the assigned hot key is highlighted;
displaying broadcasting information when object groups of the list are related broadcasting channels, wherein the broadcasting information are at least one of a current and future program schedule of the channel;
receiving selection signals indicating a plurality of selections in the plurality of object groups; and
assigning the selected objects in the plurality of object groups to the selected specific hot key.

* * * * *